(12) United States Patent
Johnson

(10) Patent No.: US 6,253,712 B1
(45) Date of Patent: Jul. 3, 2001

(54) POSITIONABLE AND EXPANDABLE TUBE SYSTEM HAVING SLOTTED TUBE SEGMENTS

(76) Inventor: Gregory G. Johnson, 3417 Longfellow Ave. South, Minneapolis, MN (US) 55407

( * ) Notice: Subject to any disclaimer, the term of this patent is extended or adjusted under 35 U.S.C. 154(b) by 0 days.

(21) Appl. No.: 09/470,114

(22) Filed: Dec. 22, 1999

(51) Int. Cl.[7] .............................. A01K 29/00; F16L 27/04
(52) U.S. Cl. ........................ 119/707; 119/452; 446/69; 446/125; 285/261
(58) Field of Search ..................... 119/707, 702, 119/417, 421, 452, 472; D30/160; 446/69, 124, 125; 285/261, 304; 482/35

(56) References Cited

U.S. PATENT DOCUMENTS

| | | | |
|---|---|---|---|
| 100,726 | * | 3/1870 | Coar . |
| 3,104,897 | * | 9/1963 | Berger . |
| 3,515,414 | * | 6/1970 | Kowalewski . |
| 3,695,646 | * | 10/1972 | Mommsen ............................ 285/261 |
| 4,081,189 | * | 3/1978 | Dumas ............................... 285/121.6 |
| 4,117,565 | * | 10/1978 | Asada et al. ............................ 75/229 |
| 4,699,601 | * | 10/1987 | Hershfeld ............................... 446/69 |
| 5,387,165 | * | 2/1995 | Warren .................................... 482/35 |
| 5,391,014 | * | 2/1995 | Chen ....................................... 403/74 |
| 5,449,206 | * | 9/1995 | Lockwood ............................ 285/261 |
| 5,921,204 | | 7/1999 | Johnson ................................ 119/452 |
| 6,161,975 | * | 12/2000 | Clarke .................................... 401/34 |

* cited by examiner

Primary Examiner—Charles T. Jordan
Assistant Examiner—Yvonne R. Abbott
(74) Attorney, Agent, or Firm—Hugh D. Jaeger

(57) ABSTRACT

A positionable and expandable tube system composed of snappingly engageable slotted tube segments for the construction of hamster, gerbil, or like pet tubes. Each tube segment consists of an upper and a lower truncated sphere connected at an annular intersection. The preferred embodiment incorporates an upper truncated sphere having a plurality of tapered slots delineating flexible arcuate portions which can be flexed inwardly upon contact with a lower truncated sphere of a succeeding tube segment to reduce the cross section of the upper truncated sphere to allow easily accomplished entry into the lower truncated sphere of a succeeding tube segment. The tube segments, when snappingly engaged, create frictionally positionable ball and socket joints.

20 Claims, 6 Drawing Sheets

POSITIONABLE AND EXPANDABLE TUBE SYSTEM HAVING SLOTTED TUBE SEGMENTS

CROSS REFERENCES TO CO-PENDING APPLICATIONS

None.

BACKGROUND OF THE INVENTION

1. Field of the Invention

The present invention relates to the field of pets; more specifically, pet accessories and toys. The positionable and expandable tube system which utilizes slotted tube segments pertains to a series of snappingly engaged, rotatable segments which snappingly engage using ball and socket-type joints. The tube system may be used for pets such as hamsters, gerbils, rats and the like.

2. Description of the Prior Art

The prior art in the field of pet accessories used rigidly connected segments of brittle tubing and separate connectors which have limited positionability. With the currently available tube components, the user must incorporate multiple tube segments and connectors to create an angled pathway, whereas the present invention provides for multiple positioning without connectors, using a plurality of like tube segments.

SUMMARY OF THE INVENTION

The general purpose of the present invention is to provide a pet accessory tube system having positionable and expandable tube system segments which are snappingly engaged utilizing ball and socket joints.

According to one embodiment of the present invention, there are provided tube segments, each including an upper and lower truncated sphere, an upper and lower annular surface, and an annular intersection. The upper truncated sphere of each tube segment includes a plurality of tapered slots which delineate flexible arcuate portions which can be flexed and positioned inwardly to allow positioning of the upper truncated sphere into the lower truncated sphere of a succeeding tube segment.

One significant aspect and feature of the present invention is the flexibility of the tube system provided by the ball and socket joints.

Another significant aspect and feature of the present invention is the beveled annular surface which prevents gnawing by animals using the tube system and which provides smooth interconnection between coupled tube segments.

A further significant aspect and feature of the present invention is the option of having clear or multi-colored tube segments.

Yet another significant aspect and feature of the present invention is the snapping engagement of the tube segments which requires no special tools.

Still another significant aspect and feature of the present invention is a tube segment having upper and lower truncated spheres.

Yet another significant aspect and feature of the present invention is the inclusion of tapered slots in the upper truncated sphere which delineate flexible arcuate portions.

Yet another significant aspect and feature of the present invention is arcuate portions at the upper truncated sphere which can be flexed inwardly upon contact with the lower edge of a lower truncated sphere of a succeeding tube segment to gain passage into the lower truncated sphere of a succeeding tube segment.

Still another significant aspect and feature of the present invention is the use of arcuate portions which, because of position memory, return to a predetermined position to maintain a constant spherical radius.

Having thus set forth significant aspects and features of the present invention, it is the principal object of the present invention to provide a positionable and expandable pet tube system.

One object of the present invention is to provide a versatile tube system for use in hamster, gerbil or other small pet animal habitats that is capable of being configured to create an aesthetically pleasing passageway which can be easily altered to change the appearance and arrangement of the animal habitat.

Another object of the present invention is to provide a tube system for animal habitats which is constructed of easily assembled parts that can be quickly erected in a variety of shapes and can be readily dismantled for cleaning, all without the need for tools.

A further object of the present invention is the provision of a tube system which maintains its position and configuration by frictional engagement of its component parts.

An additional object of the present invention is the provision of a tube system in which a minimum of condensation takes place in the interior thereof and in which ample oxygen is present for animals within the tube system.

A still further object of the present invention is to provide a tube system formed of interconnected segments wherein the internal surface is smooth and free of surfaces which can be gnawed by animals using the same.

These and other objects of the present invention are fulfilled by the tube system next described in detail.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
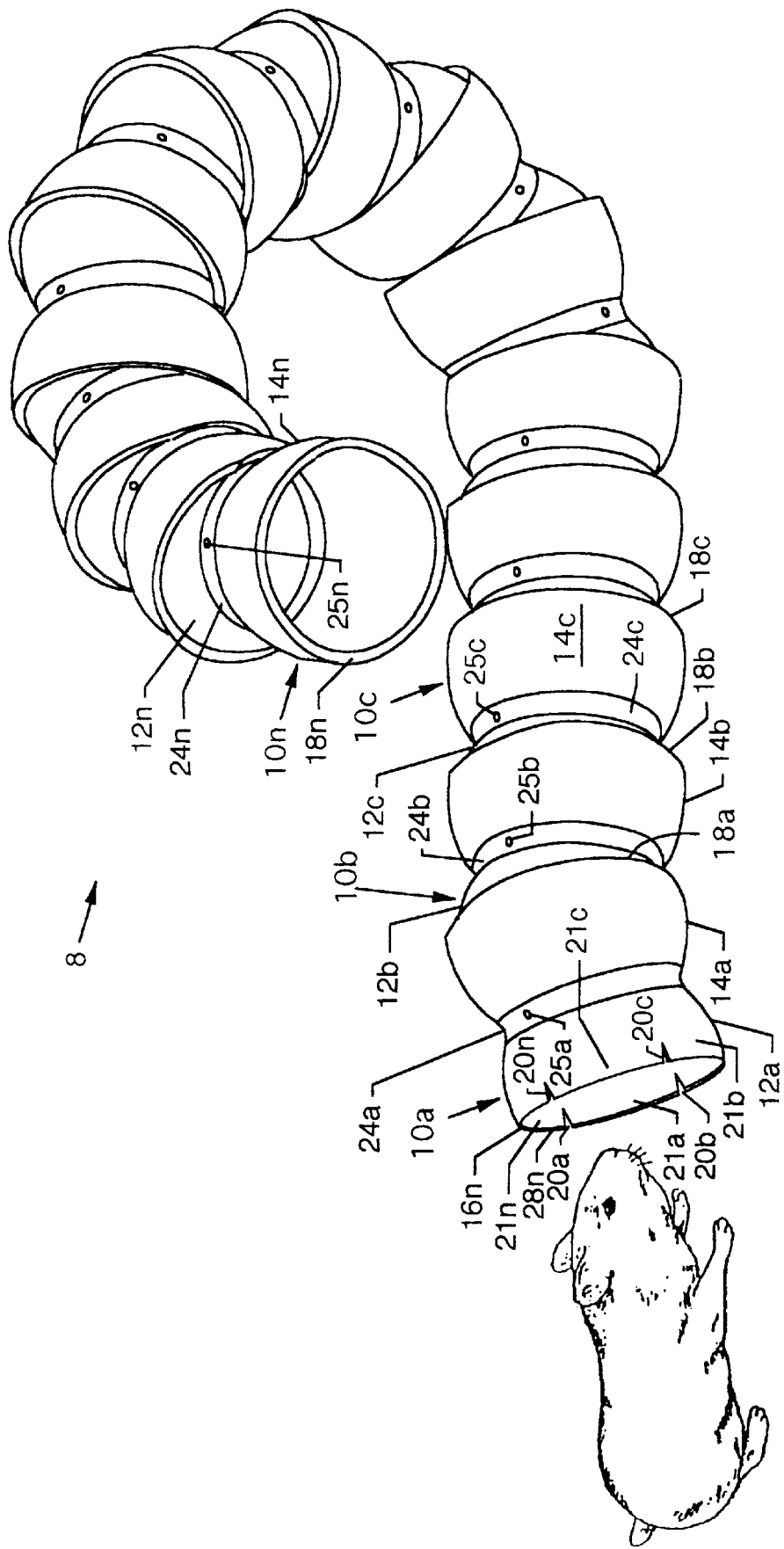
FIG. 1 illustrates a perspective view of a positionable and expandable tube system composed of interconnected tube segments, the present invention.

FIG. 1 illustrates a perspective view of a positionable and expandable tube system 8 comprised of a plurality of slotted tube segments 10a–10n which are snappingly engaged in an end-to-end fashion utilizing ball and socket joints. The tube segments 10a–10n are constructed of a thermal plastic such as ABS, SAN, polycarbonate or other appropriate material which is durable, flexible and can be produced in transparent or multi-colored versions. Any suitable polymer material is appropriate for each of the tube segments.

Figure 2:
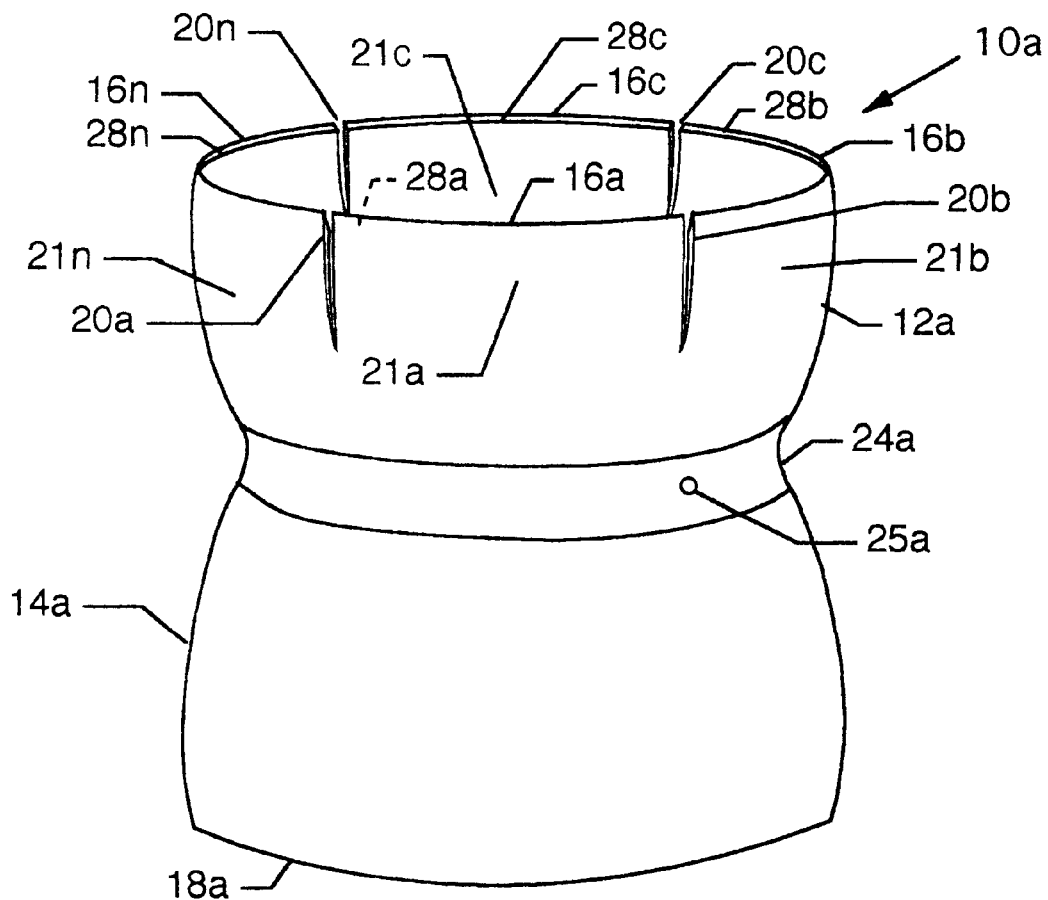
FIG. 2 illustrates a perspective view of a tube segment having tapered slots and arcuate portions.

FIG. 2 illustrates a perspective view of tube segment 10a. Tube segments 10a–10n are all identical in construction and design and have an hour-glass configuration. Tube segment 10a is now described. Tube segment 10a consists of an upper truncated sphere or bulbous end portion 12a, a lower truncated sphere or bulbous end portion 14a, and an annular intersection or narrow, hollow, annular, waist section or narrowed mid section 24a, all of uniform and identical wall thickness. An interrupted upper annular surface or peripheral end edge, which includes interrupted upper annular surfaces or peripheral end edges 16a–16n, of the upper truncated sphere or bulbous end portion 12a has a slightly smaller radius than the lower annular surface or peripheral end edge 18a of the lower truncated sphere or bulbous end portion 14a. Also located on the upper truncated sphere or bulbous end portion 12a are a plurality of generally V-shaped tapered slots 20a–20n extending downwardly from between the peripheral end edges 16a–16n and partially along the curved side wall of the upper truncated sphere or bulbous end portion 12a. The tapered slots 20a–20n delineate arcuate portions 21a–21n including the interrupted upper annular surface or peripheral end edges 16a–16n and the regions between the tapered slots 20a–20n, respectively. Relief for inward flexing of the arcuate portions 21a–21n is offered by the tapered slots 20a–20n, whereby the arcuate portions 21a–21n are flexible, especially in a direction toward the center of the tube segment 10a. This inward flexibility allows the radius of each interrupted upper annular surface or peripheral end edge 16a–16n and the spherical radius of each arcuate portion 21a–21n to be easily decreased to allow readily and easily accomplished mating of one tube segment, such as 10a, to another tube segment, as later described in detail. Tapering of the tapered slots 20a–20n prevents interference of the arcuate portions 21a–21n with each other during inwardly-directed flexing. Also provided at the annular intersection or narrow, hollow, annular, waist section or narrowed mid section 24a is an air hole 25a which prevents condensation in the tube system and allows entry of the oxygen which the hamster, gerbil, or other animal needs to live. The air hole is not essential but is preferred. Of course, several air holes rather than a single air hole could be provided in the annular intersection, if desired.

Figure 3:
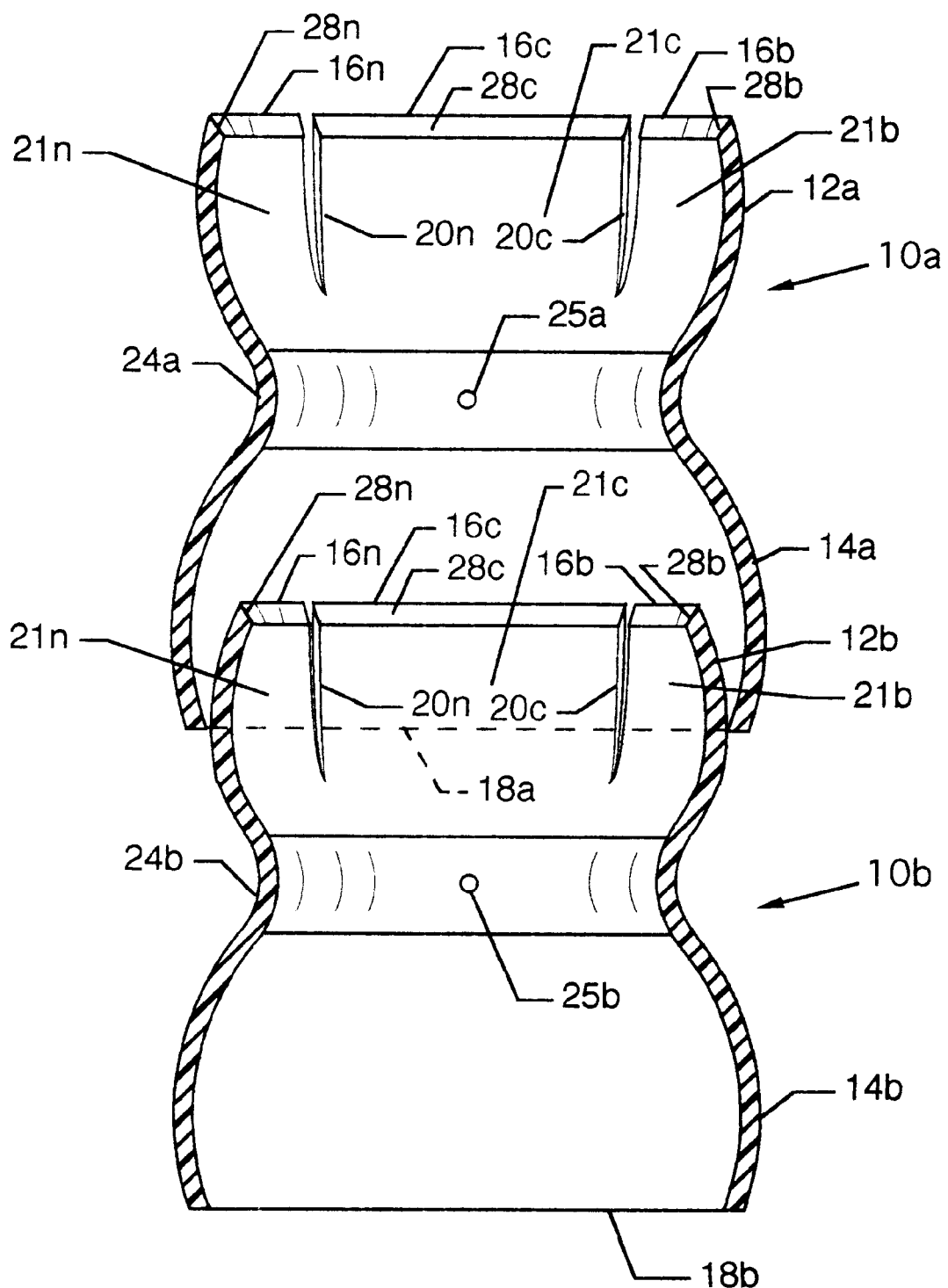
FIG. 3 illustrates a cross sectional side view of two tube segments aligned during the initial alignment for interconnection.

FIG. 3 illustrates a cross sectional side view of two tube segments 10a and 10b aligned during the first phase of interconnection, where all numerals correspond to those elements previously or otherwise described. Specifically shown in this figure is the initial alignment and engagement of upper truncated sphere or bulbous end portion 12b of tube segment 10b with relation to lower truncated sphere or bulbous end portion 14a of tube segment 10a. Interrupted annular bevels 28a–28n on the interrupted upper annular surfaces or peripheral end edges 16a–16n, respectively, provide for initial smooth interior engagement between tube segments 10a and 10b, and prevent gnawing by hamsters, gerbils and the like. The interrupted upper annular surfaces or peripheral end edges 16a–16n of the lower tube segment 10b are brought into intimate contact with the lower annular surface or peripheral end edge 18a of the upper tube segment 10a and force is applied to cause inward flexing of the arcuate portions 21a–21n as urged by the lower annular surface or peripheral end edge 18a. This action causes the radius of each interrupted upper annular surface or peripheral end edge 16a–16n and of each arcuate portion 21a–21n of the upper truncated sphere or bulbous end portion 12b of the lower tube segment 10b to decrease sufficiently to subsequently be accommodated by the lower truncated sphere or bulbous end portion 14a of the upper tube segment 10a. During flexible compression and inward deflection of the arcuate portions 21a–21n of the upper truncated sphere or bulbous end portion 12b of the lower tube segment 10b by the lower annular surface or peripheral end edge 18a, tapered slots 20a–20n offer structural relief to the upper truncated sphere or bulbous portion 12b to allow a portion of the spherical radius thereof to be gradually decreased. During this action, the dimension across the open region of the taper of each of the tapered slots 20a–20n is decreased as the opposing vertically aligned edges of each tapered slot 20a–20n are urged toward each other.

Figure 4:
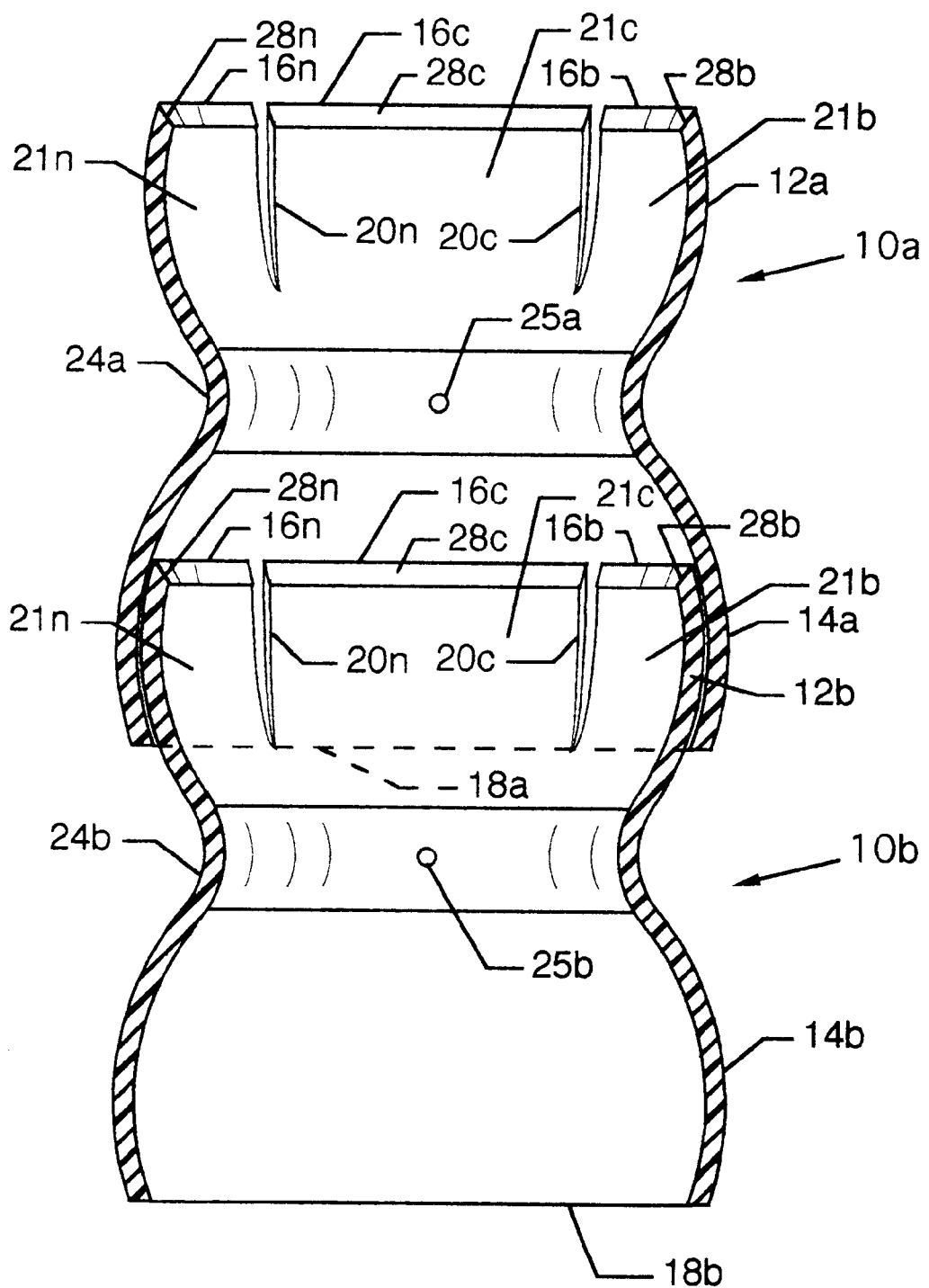
FIG. 4 illustrates a cross sectional side view of two tube segments interconnected.

FIG. 4 illustrates a cross sectional side view of tube segments 10a and 10b interconnected, where all numerals correspond to those elements previously described. Further urging together of the tube segments 10a and 10b results in the mutual interconnection of the tube segments 10a and 10b, as illustrated. The spring memory of the arcuate portions 21a–21n returns the arcuate portions 21a–21n from the compressed position, as illustrated in FIG. 3, to the normal shape of the upper truncated sphere or bulbous end portion 12b to a state reflecting a constant spherical radius. Illustrated in detail is the slight spherical radial difference of the upper truncated sphere or bulbous end portion 12b compared to the lower truncated sphere or bulbous end portion 14a and the relationship thereof which results in the interconnection of tube segments 10a and 10b completing a frictionally engaged ball and socket joint. That is to say that the outer surface of the upper truncated sphere or bulbous end portion 12b, having a smaller spherical radius than the truncated sphere or bulbous end portion 14a, aligns in intimate contact to and against the inner surface of the lower truncated sphere or bulbous end portion 14a.

Mode of Operation

Figure 5:
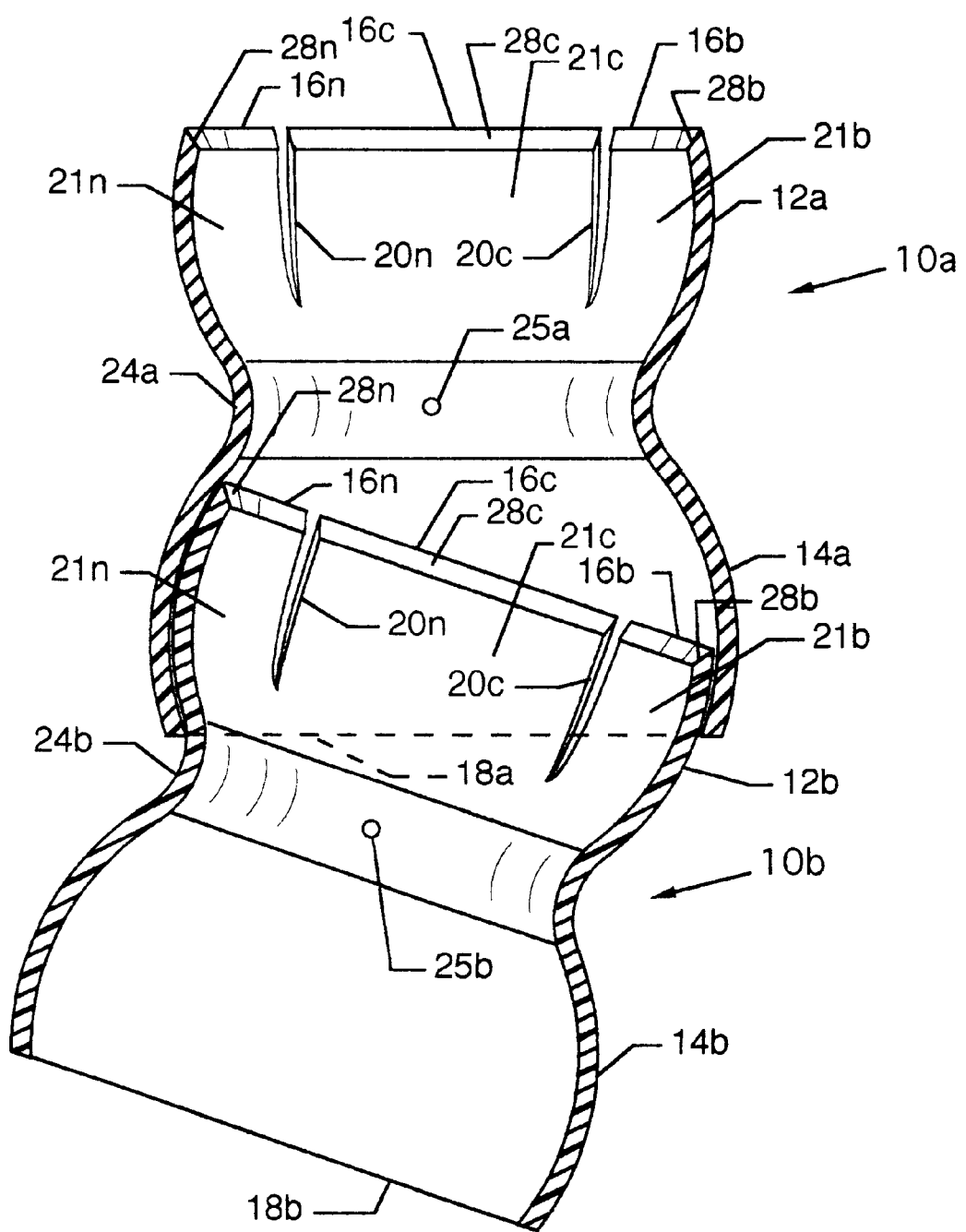
FIG. 5 illustrates a cross sectional side view of two tube segments interconnected and mutually positioned at an angle to each other; and, FIG. 6, and alternative embodiment, illustrates the modification of the lower portion of the tube segments.

FIG. 5 illustrates a cross sectional side view of tube segments 10a and 10b snappingly engaged and positioned at an angle with respect to each other. As illustrated in FIG. 1, a plurality of tube segments 10a–10n may be snappingly engaged in an end-to-end fashion, creating unlimited expansion of the positionable and expandable tube system 8. The ball and socket joints created by the intersection of tube segments 10a–10n allow the user to rotationally position the tubing segments 10a–10n in any number of various positions.

Figure 6:
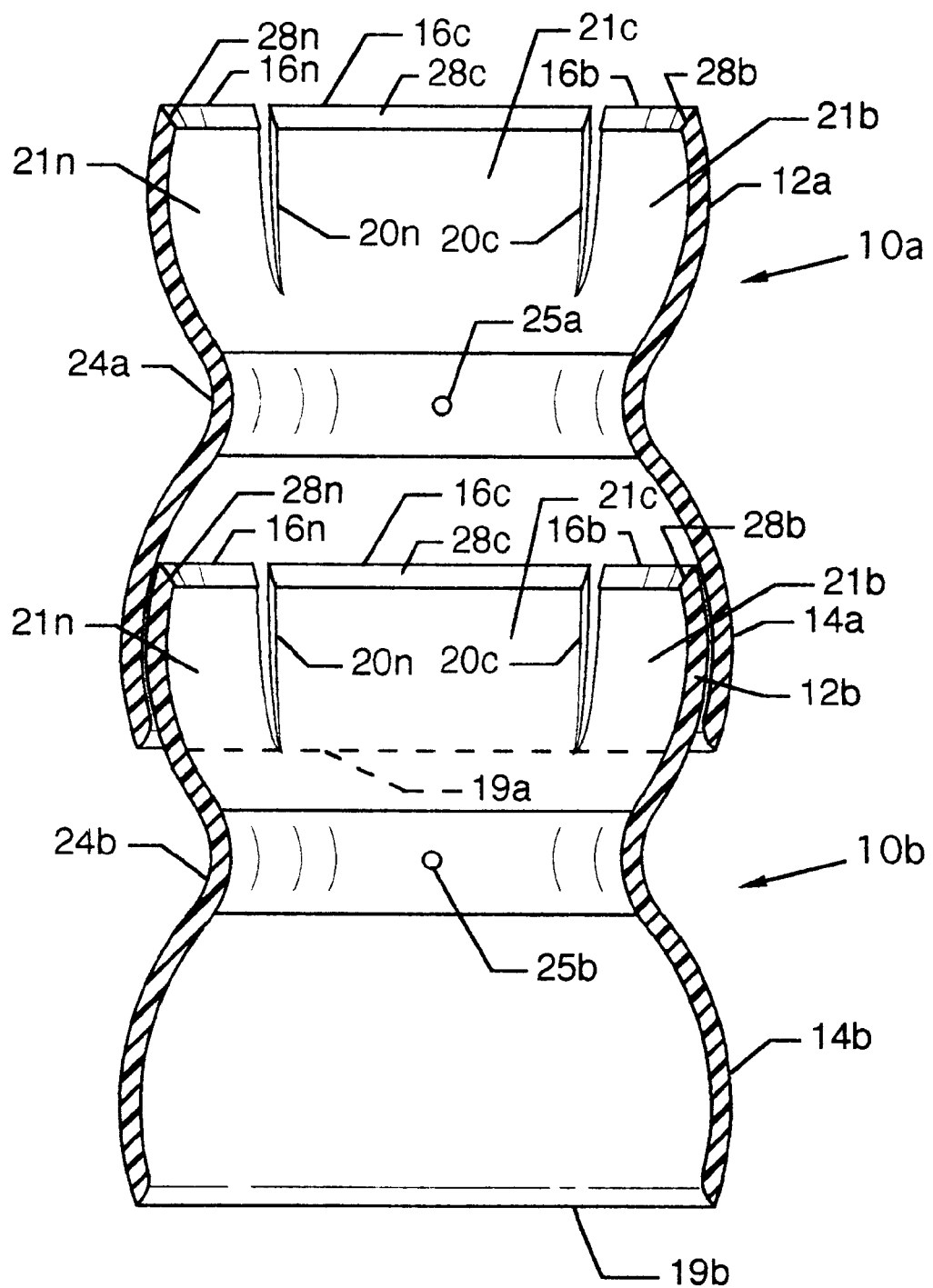

FIG. 6, an alternative embodiment, where all numerals correspond to those elements previously or otherwise described, illustrates the modification of tube segments 10a and 10b where lower annular inwardly curved surfaces or peripheral end edges 19a–19n have been substituted for lower annular surfaces or peripheral end edges 18a–18b. The lower annular inwardly curved surfaces or peripheral end edges 19a–19n present a generally curved surface delineating a larger opening for ease of initial alignment and entry of the interrupted upper annular surfaces or peripheral end edges 16a–16n of a lower tube segment (10b) with the lower annular inwardly curved surfaces or peripheral end edge 19a of the upper tube segment (10a).

Various modifications can be made to the present invention without departing from the apparent scope hereof.

I claim:

1. A tube segment for use with other identical tube segments to create a tube system for pets, the tube segment comprising:
   a. a first hollow truncated sphere having an outer surface and an inner surface;
   b. a second hollow truncated sphere having an outer surface and an inner surface;
   c. the radius of curvature of said inner surface of said second hollow truncated sphere being slightly greater than the radius of curvature of said outer surface of said first hollow truncated sphere;
   d. a narrow, hollow, annular waist section having a concave outer surface and a convex inner surface;
   e. said first and second hollow truncated spheres being joined together by said narrow, hollow, annular waist section with said outer surfaces of said first and second hollow truncated spheres merging smoothly with said outer concave surface of said narrow, hollow, annular waist section and said inner surfaces of said first and second hollow truncated spheres merging smoothly with said inner convex surface of said narrow, hollow, annular waist section, thereby forming a tubular element of hour-glass configuration having said first hollow truncated sphere as one end portion thereof, said second hollow truncated sphere as the other end portion thereof, and said narrow, hollow, annular waist section as the mid section thereof;
   f. said first and second hollow truncated spheres each terminating in an annular peripheral end edge remote from said narrow, hollow, annular waist section; and,
   g. said first hollow truncated sphere having a plurality of tapered slots formed therein extending from said outer surface to said inner surface, each said tapered slot beginning at said annular peripheral edge of said first hollow truncated sphere and converging toward said narrow, hollow, annular waist section.

2. The tube segment as defined in claim 1, wherein said first hollow truncated sphere, said second hollow truncated sphere, and said narrow, hollow, annular waist section all have uniform and identical wall thicknesses.

3. The tube segment as defined in claim 1, wherein said first hollow truncated sphere, said second hollow truncated sphere, and said narrow, hollow, annular waist section are formed as a unitary, one-piece construction.

4. The tube segment as defined in claim 1, wherein the entire tube segment is formed in one piece out of a plastic material.

5. The tube segment as defined in claim 1, wherein said narrow, hollow, annular waist section has at least one air hole extending therethrough.

6. The tube segment as defined in claim 1, wherein each of said tapered slots is generally V-shaped in configuration, and wherein said tapered slots delineate a plurality of arcuate portions in said first hollow truncated sphere.

7. The tube segment as defined in claim 1, wherein said annular peripheral end edge of said first hollow truncated sphere is beveled outwardly from said inner surface of said first hollow truncated sphere to said outer surface of said first hollow truncated sphere.

8. The tube segment as defined in claim 1, wherein said slightly greater radius of curvature of said inner surface of said second hollow truncated sphere compared to said radius of curvature of said outer surface of said first hollow truncated sphere is so slight that if said first hollow truncated sphere were inserted into said second hollow truncated sphere, said outer surface of said first hollow truncated sphere would frictionally engage said inner surface of said second hollow truncated sphere.

9. A tube segment for use with other identical tube segments to create a tube system for pets, the tube segment comprising: an open-ended, one-piece tubular element of hour-glass configuration having bulbous end portions and a narrowed mid section, each of said bulbous end portions having a curved convex outer wall surface and a curved concave inner wall surface, and said narrowed mid section having a curved concave outer wall surface and a curved convex inner wall surface, said curved convex outer wall surface of one of said bulbous end portions having a radius of curvature that is slightly less than the radius of curvature of said curved concave inner wall surface of the other one of said bulbous end portions, each of said bulbous end portions terminating in an annular peripheral edge remote from said narrowed mid section, and said one of said bulbous end portions having a plurality of tapered slots formed therein extending from said curved convex outer wall surface to said curved concave inner wall surface, each said tapered slot beginning at said annular peripheral edge of said one of said bulbous end portions and converging toward said narrowed mid section.

10. The tube segment as defined in claim 9, wherein said bulbous end portions and said narrowed mid section all have uniform and identical wall thicknesses.

11. The tube segment as defined in claim 9, wherein said open-ended, one-piece tubular element of hour-glass configuration having bulbous end portions and a narrowed mid section is formed entirely of plastic material.

12. The tube segment as defined in claim 9, wherein said narrowed mid section has at least one air hole extending therethrough.

13. The tube segment as defined in claim 9, wherein each of said tapered slots is generally V-shaped in configuration, and wherein said tapered slots delineate a plurality of arcuate portions in said one of said bulbous end portions.

14. The tube segment as defined in claim 9, wherein said annular peripheral edge of said one of said bulbous end portions is beveled outwardly from said curved concave inner wall surface thereof to said curved convex outer wall surface thereof.

15. A tube system for pets comprising:
   a. a plurality of identical tube segments;
   b. each of said identical tube segments comprising:
      (1) a first hollow truncated sphere having an outer surface and an inner surface;
      (2) a second hollow truncated sphere having an outer surface and an inner surface;
      (3) the radius of curvature of said inner surface of said second hollow truncated sphere being slightly greater than the radius of curvature of said outer surface of said first hollow truncated sphere;
      (4) a narrow, hollow, annular waist section having a concave outer surface and a convex inner surface;
      (5) said first and second hollow truncated spheres being joined together by said narrow, hollow, annular waist section with said outer surfaces of said first and second hollow truncated spheres merging smoothly with said outer concave surface of said narrow, hollow, annular waist section and said inner surfaces of said first and second hollow truncated spheres merging smoothly with said inner convex surface of said narrow, hollow, annular waist section, thereby forming a tubular element of hour-glass configuration having said first hollow truncated sphere as one end portion thereof, said second hollow truncated sphere as the other end portion thereof, and said narrow, hollow, annular waist section as the mid section thereof;

(6) said first and second hollow truncated spheres each terminating in an annular peripheral end edge remote from said narrow, hollow, annular waist section; and, (7) said first hollow truncated sphere having a plurality of tapered slots formed therein extending from said outer surface to said inner surface, each said tapered slot beginning at said annular peripheral edge of said first hollow truncated sphere and converging toward said narrow, hollow, annular waist section; and, c. said plurality of identical tube segments being successively engaged with one another, with said outer surface of the first hollow truncated sphere of one tube segment mutually frictionally engaging said slightly greater radius of curvature inner surface of the second hollow truncated sphere of another tube segment, thereby producing a tube system which can be altered in configuration by movement of said identical tube segments with respect to one another about the mutually frictionally engaged surfaces.

16. The tube system as defined in claim 15, wherein said narrow, hollow, annular waist section of each identical tube segment has at least one air hole extending therethrough.

17. The tube system as defined in claim 15, wherein each identical tube segment is a unitary, one-piece construction.

18. The tube system as defined in claim 15, wherein each identical tube segment has a uniform wall thickness throughout.

19. The tube system as defined in claim 15, wherein each of said tapered slots is generally V-shaped in configuration, and wherein said tapered slots delineate a plurality of arcuate portions in said first hollow truncated sphere.

20. The tube system as defined in claim 15, wherein said annular peripheral end edge of said first hollow truncated sphere of each identical tube segment is beveled outwardly from said inner surface of said first hollow truncated sphere to said outer surface of said first hollow truncated sphere, thereby forming smooth interior surface transitions between the inner surface of each first hollow truncated sphere and the inner surface of each second hollow truncated sphere of the successively engaged identical tube segments.

* * * * *